United States Patent [19]

Barker et al.

[11] 4,162,744

[45] Jul. 31, 1979

[54] SEED DISPENSING DEVICE

[76] Inventors: Robert J. Barker, 26 Ashley Rd., Newmarket, Suffolk; Brynley M. Barker, 18 Saxon Rise, Bury St. Edmunds, Suffolk, both of England

[21] Appl. No.: 846,011

[22] Filed: Oct. 27, 1977

[30] Foreign Application Priority Data

Oct. 28, 1976 [GB] United Kingdom ............... 44763/76

[51] Int. Cl.² .............................................. A01C 7/04
[52] U.S. Cl. ..................................... 221/251; 111/77; 221/254; 221/266
[58] Field of Search ............... 221/254, 277, 211, 251, 221/266, 217, 219, 220; 111/77, 78

[56] References Cited

U.S. PATENT DOCUMENTS

| | | | |
|---|---|---|---|
| 3,387,746 | 6/1968 | Whipple | 221/211 |
| 3,693,833 | 9/1972 | Weitz | 221/211 |
| 3,999,690 | 12/1976 | Deckler | 221/211 X |

FOREIGN PATENT DOCUMENTS 1,450,677  9/1976  United Kingdom .

*Primary Examiner*—Robert J. Spar
*Assistant Examiner*—Francis J. Bartuska
*Attorney, Agent, or Firm*—Cushman, Darby & Cushman

[57] ABSTRACT

A seed dispensing device comprising a housing in which is rotatably mounted a wheel member having a plurality of spokes each carrying a seed cup. The cups pick up seeds from a reservoir on rotation of the wheel member and under the combined action of centrifugal and gravitational forces discharge the seeds to an outlet chute. Opposed brushes are provided in the housing between which the cups pass to sweep excess seeds from the cups and to aid retention of a single seed in each cup to the discharge point. A rotatable cleaning brush element having tangential bristles is mounted in the housing to clean cups prior to the cups entering the mass of seeds in the reservoir. Further brushes and excess seed catching gutters may be provided to assist the reliability of solely a single seed being discharged at predetermined intervals. A power-operated ejector may be arranged to discharge foreign matter or broken seeds and so on from the reservoir.

15 Claims, 4 Drawing Figures

SEED DISPENSING DEVICE

BACKGROUND OF THE INVENTION (a) Field of the Invention

This invention relates to a seed dispensing device.

(b) Description of the Prior Art

In our British Pat. No. 1450677, we have described a seed dispensing device which may form part of a seed drill and which is arranged to dispense seeds one at a time at regular, predetermined intervals. In its broadest aspect, that seed dispensing device comprises a housing defining a reservoir for seeds, inlet means which in use enable seeds to be fed into the reservoir there to form a mass of seeds, a wheel member mounted in a substantially vertical plane for rotation in at least one direction within the housing and having a number of spoke-like projections thereon, a cup capable of loosely holding a seed mounted on each such projection adjacent the periphery of the wheel and so oriented that it opens tangentially and forwardly in said direction of rotation of the wheel, thus upon rotation thereof through the mass of seeds permitting said cups as they pass therethrough to pick up seeds, brushes arranged within the housing beyond the reservoir in said direction of rotation which brush against the cups and aid retention of seeds therein as each cup is rotated past the top dead center position, and outlet means situated in the housing outside the periphery of the wheel member beyond said brushes in the direction of rotation for receiving seeds discharged from said cups under centrifugal and gravitational forces and dispensing the same. Such a seed dispenser is referred to hereinafter as our "seed dispensing device of the kind described."

Though our seed dispensing device of the kind described in general functions well, we have found nevertheless that the delivery of seeds may in certain circumstances not be perfectly regular. For instance, occasionally two seeds may be delivered at once, or no seed may be delivered when one would be expected. These defects may be attributed to one or more causes, such as a cup picking up two seeds rather than one, or a cup picking up foreign matter rather than a seed and delivering that foreign matter to the outlet means.

OBJECTS OF THE INVENTION

It is a principal object of the invention to provide a seed dispersing device of the kind described in our British Pat. No. 1450677 but which is improved to yield a yet more regular and reliable delivery of seeds.

It is a further object to provide a seed dispensing device which employs a rotatable brush adapted to clean each seed dispensing cup before the cup is passed through the reservoir of seeds.

It is a further object of this invention to provide an arrangement of brushes in the housing better to hold a seed once located in a cup until that seed is to be discharged into the outlet chute, and more effectively to remove excess seeds from the wheel member, spokes or cups.

These and other objects will become apparent from the following description of the invention.

SUMMARY OF THE INVENTION

In accordance with the above objects, this invention provides a seed dispensing device of the kind described in our British Pat. No. 1450677 and comprising a housing defining a reservoir for holding a mass of seeds, a wheel member mounted in a substantially vertical plane for rotation in one direction within said housing, a number of spoke-like projections radiating from said wheel member, a cup mounted on the radially outer end of each said projection and so oriented that the cup mouth opens tangentially and forwardly in said direction of rotation of the wheel member for picking up one seed from the reservoir on rotation of said wheel member, opposed brushes arranged within the housing beyond the reservoir in said direction of rotation which brushes brush against the cups to aid retention of seeds therein as each cup is rotated past the top dead centre position, outlet means from said housing situated outside the periphery of wheel member beyond said brushes in the direction of rotation for receiving seeds discharged from said cups under the combined action of centrifugal and gravitational forces and dispensing the same, ejecting means to eject foreign matter from the mass of seeds contained in the reservoir, the ejecting means comprising an aperture formed in the lower part of the housing, a plate partially blocking said aperture, and driving means to impart an oscillatory movement to the plate whereby foreign matter is rolled out of the aperture when said plate is oscillated by said driving means, and cleaning brush means for cleaning each cup prior to said cup entering the mass of seeds in the reservoir.

Inevitably, the reservoir comes to contain a certain amount of matter other than whole seeds for picking up by the cups. We have found it is possible to discharge this matter from the bottom of the reservoir, by providing an aperture in the bottom portion of the housing, ejecting means comprising a plate partially blocking said aperture, and driving means to impart an oscillatory movement to the plate whereby foreign matter may be carried out of the reservoir between the plate and the walls of the housing defining the aperture when the plate is moved.

Preferably, the plate is arcuate in form and is mounted for pivotal movement about an axis coincident with the axis of the curvature of the plate, the driving means being provided to rock the plate about that axis. Advantageously, the gap between the plate and the housing defining the aperture is adjustable, whereby the ejecting means may be pre-set for different sizes of seeds; the gap when adjusted should be slightly smaller than the smallest seed being dispensed so that seeds will not pass out through the gap and yet foreign matter—such as broken seeds, chaff, dust and so on—will be ejected.

BRIEF DESCRIPTION OF THE DRAWINGS

In order that the invention may better be understood, it will now be described in greater detail, reference being made to the accompanying drawings, in which.

DESCRIPTION OF THE PREFERRED EMBODIMENTS

Figure 1:
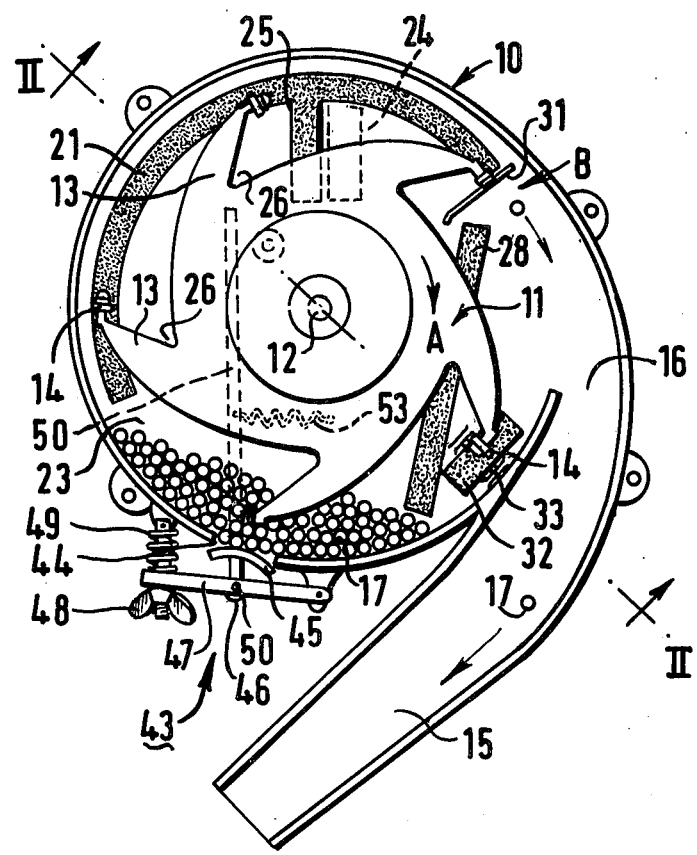
FIG. 1 is a side view of the apparatus of this invention, but with a side of the housing removed for clarity.

In the said dispensing device of this invention, the preferred disposition of the axis of the cleaning brush element relative to the wheel member depends upon the precise angular orientation of the bristles, but a good cleaning action is obtained if the axis of the cleaning brush element is normal to and intersects the axis of the wheel member. By then arranging for the greater part of the cleaning brush element to lie to one side of the plane of rotation of the wheel member and by directing the bristles appropriately, the bristles will enter the mouths of the cups as the wheel member rotates, and as the cups move past the cleaning brush means, the cleaning brush element will be rotated and the bristles will perform a sweeping action to carry any matter out of the cups.

The bristles of the cleaning brush element preferably are tangential to a circle the diameter of which is substantially one half of the overall diameter of the cleaning brush.

With our earlier design of seed dispensing device, one reason for an error in the regular delivery of seeds to the outlet means is if a cup happens to pick up two seeds, rather than a single seed. The removal of excess seeds can significantly be improved by appropriate design of the brushes provided in our earlier design. Thus, according to a further aspect of this invention, a pair of arcuately extending brushes having the free ends of their bristles facing each other are mounted within the housing of our seed dispensing device, said brushes extending arcuately around the housing from a position adjacent the reservoir to a position adjacent the point at which seeds are discharged from the cups to the outlet means, and being disposed so a cup is brushed by both brushes for substantially the whole of the arc of rotation after the cup leaves the reservoir to the discharge point.

It has been found that by providing a pair of brushes disposed as just-described and with the greatest possible arcuate extent from the reservoir to the point at which the seeds are discharged, the likelihood of a cup carrying two seeds to the discharge point is greatly reduced and, furthermore, the probability of a seed falling out of a cup prematurely—for instance through vibration—is considerably reduced.

The arrangement just-described may be improved yet further to ensure any seeds carried through the brushes other than in a cup are not discharged to the outlet means. To this end, two gutters can be disposed adjacent the ends of each said arcuate brush by the point where seeds leave the cups for discharge into the outlet means, which gutters are mounted on the housing to catch seeds fed through the bristles by the passage of the cups therethrough, and then guide any seeds caught back into the reservoir.

It will be appreciated that the provision of such gutters aims at overcoming the problem where occasionally an extra seed may be discharged to the outlet means. If two seeds both somewhat smaller than average are close together in the reservoir, it may be possible for a cup to pick up both seeds. However, as the cup passes between the bristles of the brushes, they tend to sweep out of the cup the extra seed nearer the mouth of the cup. Though the seed swept out of the cup may fall directly back into the reservoir, more usually the seed becomes trapped between the bristles of one of the two brushes. Subsequently, as the cups are moved through the brushes on rotation of the wheel member, the bristles tend to feed a caught seed either laterally out of the brush or along the brush by virtue of the movement of the bristles. Seeds fed laterally downwardly simply fall back in the reservoir. Those fed laterally upwardly either fall back into the reservoir by moving one way over the brush, or move the other way and fall on to the gutter provided in accordance with this aspect of the invention. Seeds fed along the brush eventually are discharged from the brush adjacent the point at which seeds leave the cups, to fall on the gutter. All seeds falling on the gutter are returned back to the reservoir rather than falling under gravity to the outlet means.

Observations of our earlier seed dispensing device when in operation have shown that an extra seed is occasionally dispensed to the outlet means by being carried from the reservoir in a fork between the major part of the wheel member and a spoke-like projection thereof. To overcome this, we have found that the provision of further appropriate brushes can be effective.

Accordingly, we prefer to modify our seed dispensing device by providing in the housing an extra pair of brushes disposed one to each side respectively of said wheel member with the free ends of their bristles brushing against the wheel member, the brushes extending generally radially by being spaced arcuately so that said wheel member on rotation first is brushed by one brush and then is brushed by the other brush, the brushes having a radial extent sufficient to brush the region between the major part of said wheel member and each said spoke-like projection thereof.

Preferably, said extra pair of brushes is provided part-way between the ends of the arcuate brushes disposed to sweep against the cups to remove excess seeds therefrom and to assist retention of single seeds therein. A convenient position for the extra pair of brushes is so that in the normal operating disposition of the seed dispensing device, each brush of the extra pair thereof extends substantially vertically, with one forwardly of and the other rearwardly of the axis of rotation of the wheel member. The cleaning brush means preferably consists of a generally disc-shaped brush element provided with tangentially-extending bristles, the brush element being rotatably mounted within said housing, the axis of the brush element being to one side of the plane of rotation of the wheel member and said bristles facing the open mouths of the cups as said wheel member rotates, whereby said bristles have a cleaning action by entering the cups as the cups move past the cleaning brush means after discharge of a contained seed.

By providing said cleaning brush means in accordance with this invention, it is found that each cup is most effectively cleaned of any foreign matter—such as broken seeds, chaff, or even a seed which has become wedged in a cup and thus was not discharged at the appropriate point—prior to entering the mass of seeds in the reservoir. This leads to particularly reliable collection of seeds by the cups, and owing to the absence of foreign matter in the cups, the likelihood of wedging is greatly reduced.

During trials of our seed dispensing device, it has become apparent that the filling of the reservoir with a particular depth of seeds is important if optimum performance is to be obtained. In particular, if the reservoir fills too deeply, there is likely to be much damage to the seeds caused by the considerable mechanical agitation every time a cup passes through the mass thereof. Furthermore, by increasing the depth, there is a greater likelihood that an extra seed will position itself in a cup, and though such seeds will be removed by the brushes, the brushes could become clogged with an excess of seeds. Also, the action of the wheel member itself can have a pumping effect on the seeds, in the reservoir to move the mass away from the inlet opening to the reservoir, thereby allowing more and more seeds to enter the reservoir until it greatly overfills and operation of the seed dispensing device becomes impossible. On the other hand, if the depth of seeds is not properly maintained in the reservoir, the cups eventually may stop dipping into the mass of seeds and there will be no dispensing to the outlet means. Though power-operated mechanical arrangements could be provided to ensure that the delivery of seeds to the reservoir matches the dispensing of seeds to the outlet means, it is greatly preferred that the supply of seeds to the reservoir be effected automatically under gravity to maintain the mass of seeds in the reservoir at the correct depth, for such an arrangement needs no maintenance and thus is most reliable. To obtain a satisfactory filling of the reservoir, we have however found that the position of the inlet port for a gravity-fed arrangement is most important.

As a result, we prefer to improve our seed dispensing device by providing inlet means for seeds to said reservoir which inlet means comprises a side wall of the housing defining an inlet port the plane of which is parallel to the plane of rotation of said wheel member, a hopper for seeds and a duct connecting the hopper to the inlet port to allow seeds in the hopper to fall under gravity down the duct and through the inlet port into the reservoir, at least the greater area of the port lying within a quadrant of the housing defined by two radii from the axis of rotation of said wheel member which radii extend vertically downwardly and horizontally respectively from said axis and considering the normal direction of rotation of said wheel member, there being provided an adjustable gate member for said inlet port which gate member may be moved to restrict the vertical extent of the port.

By providing said inlet port at least mostly—and preferably wholly—within the quadrant defined above of the plane of rotation of said wheel member, problems associated with the pumping of seeds and consequent overfilling of the reservoir can be overcome. The provision of an adjustable gate member for the port allows fine adjustments to be made on the precise depth of filling of the reservoir, to accommodate matters such as different sizes of seeds and the flowability—and thus of course the tendency to clog—of the seeds passing through the inlet port.

The housing itself is also preferably generally circular in vertical cross-sectional shape, though of course the region of the outlet port will be non-circular. Thus, the inlet port should be in the second lower quadrant of the housing, considering the normal sense of rotation of said wheel member.

Preferably, the inlet port has the shape generally of a quadrilateral, though advantageously the lower wall of the inlet port is arcuate so as substantially to follow the curvature of the housing itself. The other three sides of the port may however simply be linear. Optimum characteristics are obtained when the vertical extent of the inlet port tapers in a horizontal direction, with the smallest vertical extent nearest the vertical centre line of the housing. Because of the pumping action of the wheel member passing through the mass of seeds in the reservoir, the top surface of the mass of seeds tends to lie at an angle to the horizontal, and by tapering the inlet port in the manner described, the top edge of the inlet port can be on substantially the same line as that assumed by the upper surface of the mass of seeds in the reservoir when the dispenser is in use. Preferably, the gate member is mounted on the external wall of the housing so as to define the top edge of the inlet port, the gate member being adjustable both for the vertical extent of the port and for the degree of taper of the vertical extent of the inlet port.

Referring now to the drawings, there is shown a seed dispensing device constructed in accordance with the various aspects of this invention.

Figure 2:
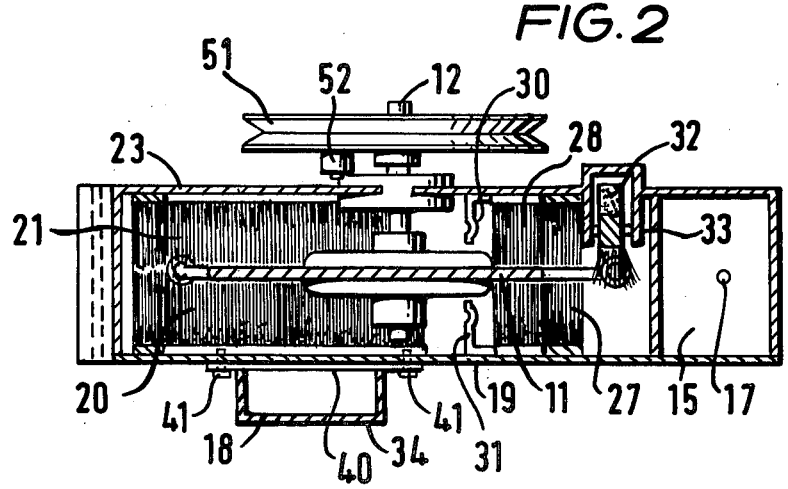
FIG. 2 is a cross-sectional view of the seed dispensing device taken on line II—II of FIG. 1, but with the seed hopper removed for clarity.
Figure 3:
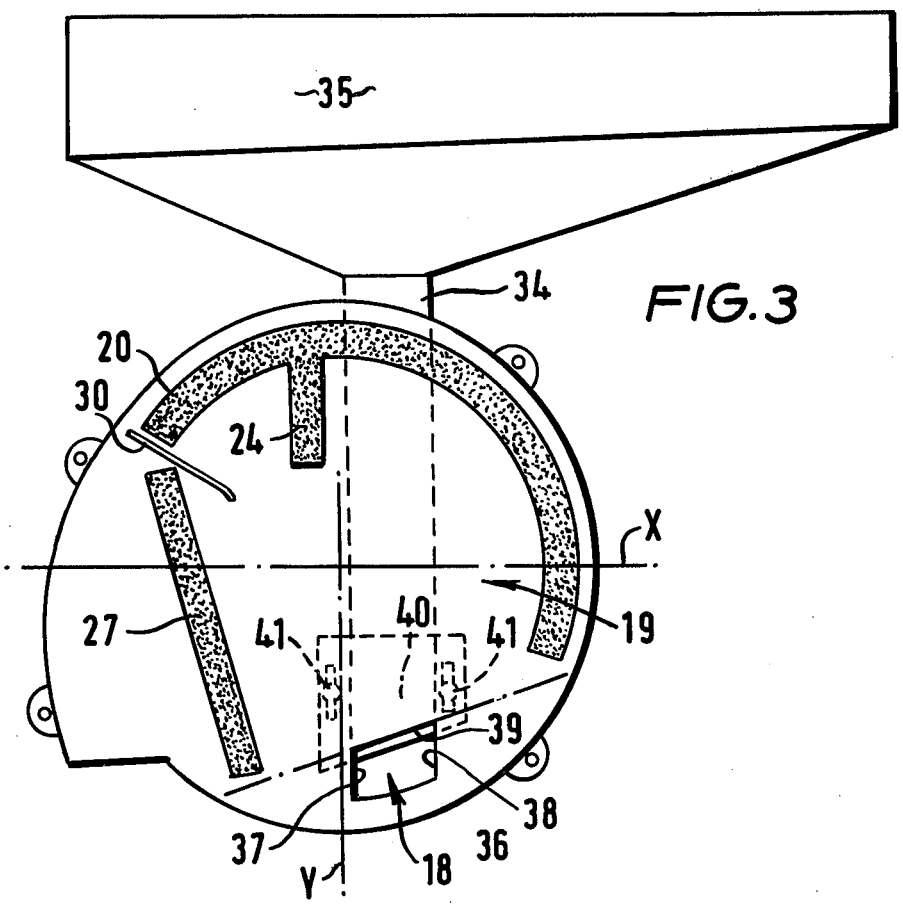
FIG. 3 is a side view of the side wall of the housing of the seed dispensing device of FIG. 1.

In FIGS. 1 to 3 of the drawings, there is shown a seed dispensing device comprising a housing 10 of generally circular cross-sectional shape, the housing having a wheel member 11 rotatably mounted therewithin on a shaft 12. The wheel member 11 has a plurality of spoke-like projections 13 each projection having a seed dispensing cup 14 detachably mounted at its free end. The mouth of each cup 14 is directed generally tangentially and forwardly, considering the normal direction of rotation of the wheel member 11, shown by arrow A in FIG. 1. The housing 10 includes an outlet chute 15 for seeds dispensed by the device, the chute 15 communicating via a port 16 with the interior of the housing. The lower part of the housing 10 is formed as a reservoir for a mass of seeds 17, the seeds being introduced thereto via an inlet port 18 formed in a cover plate 19 for the housing.

On rotation of the wheel member in the direction of arrow A, seeds are picked up one at a time by the cups as they pass through the mass of seeds in the reservoir and are carried by the cups to point B whereat the seeds are discharged from the cups under the combined effects of centrifugal and gravitational forces to be flung through the outlet port 16 into the chute 15.

Brushes 20 and 21 are mounted within the housing to each side of the wheel member 11, brush 20 being attached to cover plate 19 and brush 21 being attached to the opposed side wall 23 of the housing. The bristles of the brushes 20 and 21 face each other and the brushes are arcuately formed such that the cups pass therebetween as they move from the reservoir to point B. The arcuate extent of the brushes is arranged to be sufficiently long for the cups to be between the bristles for substantially the whole of their arc of travel after leaving the reservoir until they reach the discharge point B. The brushes 20 and 21 serve both to remove excess seeds picked up by the cups to leave a single seed in each cup, and then to aid retention of the single seed in each cup until the cup reaches the discharge point B.

In addition to brushes 20 and 21, there are provided two further brushes 24 and 25, each extending generally radially, with one provided on the cover plate 19 and the other provided on the side wall 23. The position of brush 24, when the cover plate 19 is fitted, is shown in FIG. 1, and it can be seen that the brushes are not directly opposed to one another. Considering the normal direction of rotation of the wheel member 11, a spoke-like projection first is swept by brush 25 and then by brush 24. These brushes are provided specifically to clear any seeds which may be carried in the forks 26 between the projections 13 of the wheel member and the hub part of the wheel member itself. The two brushes 24 and 25 are provided out of line with each other, so that if a seed is carried in a fork 26, it will be brushed first from one side and if it should still remain in position, the second brush will tend to sweep it out from the other side.

Though described separately, brushes 24 and 25 may form a part of brushes 20 and 21 respectively.

Yet another pair of brushes 27 and 28 are provided respectively on the cover plate 19 and on the side wall 23 of the housing, with their bristles facing one another, which brushes serve to define the rear edge of the reservoir (considering the normal sense of rotation of the wheel member in the direction of arrow A). The cups 14 of the wheel member 11 pass through the bristles of this pair of brushes 27 and 28 in order to enter the reservoir, and these brushes serve principally to prevent seeds being thrown rearwardly out of the reservoir and into the outlet chute 15 as the cups 14 agitate the mass of seeds 17 in the reservoir.

Any seeds removed from the cups 14 by the brushes 20 and 21 tend to become lodged in the bristles though some seeds may fall directly back into the reservoir. It is found that the seeds which become lodged are subsequently fed along the brushes in the direction of arrow A by the movement of the bristles as the cups successively pass through the brushes. Eventually, a seed will work its way through the brush until it reaches the end of the brush adjacent discharge point B. In order to prevent such a seed falling under gravity into the chute 15, the cover plate 19 and the side wall 23 of the housing each have a gutter 30 and 31 respectively to catch seeds released from the brushes and to return these seeds to the reservoir. Each gutter 30 and 31 comprises a plate attached to the cover plate or side wall and extending across the housing towards the other gutter, but leaving a narrow gap through which the wheel member may pass. The gutters extend downwardly and towards the shaft 12 of the wheel member, and terminate after crossing over the top of brushes 27 and 28. A seed moving under gravity along a gutter will thus fall back into the reservoir after leaving the gutter.

Figure 4:
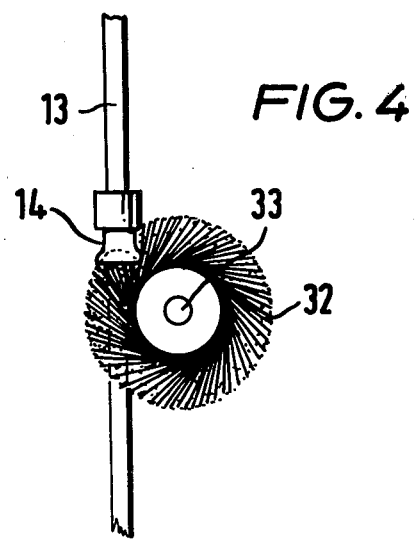
FIG. 4 is an end view of a brush employed in the device.

In order to clean the cups 14 of any matter which may have become lodged therein prior to the cups entering the reservoir, there is provided a brush 32 in the form of a disc rotatably mounted about axis 33 on side wall 23 of the housing 10. This brush has bristles extending generally tangentially (FIG. 4) and is disposed so that the bristles enter the open mouths of the cups upon rotation of the wheel member 11, the cups then imparting rotation to the brush 32 such that the bristles tend to sweep foreign matter ouf of the cups.

The cover plate 19 of the housing is provided with an inlet port 18 for seeds to enter the reservoir. The inlet port 18 is connected by a duct 34 to a hopper 35 also mounted on the cover plate 19, but disposed so that the main bulk of the hopper lies above the housing 10 as a whole and the seeds may fall under gravity along duct 34 and thus though the inlet port 18 into the reservoir. As best seen in FIG. 3, the inlet port lies wholly within the quadrant of the housing defined by radii X (extending horizontally) and Y (extending vertically). These two radii define the leading, lower quadrant of the housing, considering the normal sense of rotation of the wheel member in the direction of arrow A, and optimum filling is obtained by the positioning of the inlet port in this quadrant.

The inlet port itself is generally quadrilaterally-shaped, though the lower edge 36 is curved along its length generally in the same sense as the adjacent lower edge of the housing. Edges 37 and 38 of the port extend generally vertically, and thus are parallel to radius Y and edge 39 of the inlet port is defined by an adjustable gate member 40 releasably fastened to the housing by screws 41. The angle of this edge 39 is thus adjustable with respect to radius X, and also the vertical extent of the port may be adjusted by moving the whole of the gate member 40 vertically upwardly or downwardly. In this way, the filling of the reservoir from the hopper 35 may be controlled, as well as the absolute depth of seeds within the reservoir.

In order to assist the cleaning of foreign matter out of the reservoir, a cleaning apparatus 43 is provided at the bottom of the housing. This apparatus comprises an aperture 44 of generally rectangular shape in the cylindrical wall of the housing at the bottom of the reservoir, which aperture is partially blocked by an arcuate plate 45 fitting closely between the side walls of the housing, but defining gaps between the ends of the aperture. The plate is pivotally mounted by means of an integrally formed lug 46 on an arm 47 itself pivotally mounted on the housing, there being a screw-threaded adjuster 48 for moving the arm 47 relative to the housing, and thus moving the arcuate plate 45 further into or out of the aperture. A spring 49 is provided to bias the arm against the action of the screw-threaded adjuster, away from the housing.

Lug 46 of the arcuate plate 45 is rigidly fastened to a shaft 50 which pivotally mounts the arcuate plate on arm 47, and this shaft is bent through a right-angle to form a lever arranged to lie parallel to the housing adjacent side wall 23 on the outside thereof. The shaft 12 for the wheel member 11 is provided outside the housing and adjacent side wall 23 with a driving pulley 51, adapted to receive a V-belt drive from an appropriate power-operated source. The pulley 51 has a camming roller 52 rotatably mounted on its side face, which roller comes into engagement with the lever formed by shaft 50 on every turn of the pulley, and moves the lever against a bias provided by spring 53 to rock the arcuate plate. It will be appreciated that by an appropriate adjustment of the screw-threaded adjuster 48 to give a suitable gap between the arcuate plate 45 and the edge of the aperture defined by the housing, the seeds will be moved within the reservoir as the plate rocks, though foreign matter of a smaller size will tend to be rolled out through the gap. The gap should therefore be adjusted so as to be slightly too small to allow seeds to pass there-through, but large enough to allow foreign matter such as broken seeds and chaff as well as dust to leave the reservoir through the gap.

We claim:

1. A seed dispensing device comprising a housing defining a reservoir for holding a mass of seeds, a wheel member mounted in a substantially vertical plane for rotation in one direction within said housing, a number of spoke-like projections radiating from said wheel member, a cup mounted on the radially outer end of each said projection and so oriented that the cup mouth opens tangentially and forwardly in said direction of rotation of the wheel member for picking up one seed from the reservoir on rotation of said wheel member, opposed brushes arranged within the housing beyond the reservoir in said direction of rotation which brushes brush against the cups to aid retention of seeds therein as each cup is rotated past the top dead center position, outlet means from said housing situated outside the periphery of wheel member beyond said brushes in the direction of rotation for receiving seeds discharged from said cups under the combined action of centrifugal and gravitational forces and dispensing the same, ejecting means to eject foreign matter from the mass of seeds contained in the reservoir, the ejecting means comprising an aperture formed in the lower part of the housing, a plate partially blocking said aperture, and driving means to impart an oscillatory movement to the plate whereby foreign matter is rolled out of the aperture when said plate is oscillated by said driving means, and cleaning brush means for cleaning each cup prior to the cups entering the mass of seeds in said reservoir.

2. A seed dispensing device as claimed in claim 1, in which the plate is arcuate in form and is mounted for pivotal movement about an axis coincident with the center of the curvature of said plate, the driving means being provided to oscillate the plate about said axis.

3. A seed dispensing device as claimed in claim 1, in which the gap between said plate and the housing walls defining said aperture is adjustable, whereby the ejecting means may be pre-set for different sizes of seeds.

4. A seed dispensing device as claimed in claim 1, in which drive means for the wheel member comprises a shaft mounting said wheel member and means to rotate said shaft, the driving means for imparting oscillatory movement to the plate consists of a cam mounted on said shaft and a mechanism linked to said plate and engaged with said cam so as to cause said plate to perform a rocking oscillatory movement about its said axis.

5. A seed dispensing device as claimed in claim 1, in which said cleaning brush means for cleaning each cup prior to said cup entering the mass of seeds in the reservoir consists of a generally disc-shaped brush element provided with tangentially-extending bristles, the brush element being rotatably mounted about an axis within said housing, the axis of the brush element being to one side of the plane of rotation of the wheel member and said bristles facing the open mouths of the cups as said wheel member rotates, whereby said bristles have a cleaning action by entering the cups as the cups move past the cleaning brush means after discharge of a contained seed.

6. A seed dispensing device as claimed in claim 5, in which said axis of the cleaning brush element is normal to and intersects the axis of the wheel member.

7. A seed dispensing device as claimed in claim 5, in which the bristles of the cleaning brush element are disposed tangential to a circle the diameter of which is substantially one half of the overall diameter of the cleaning brush.

8. A seed dispensing device as claimed in claim 1, in which said opposed brushes arranged within the housing beyond the reservoir are arcuate, the free ends of the bristles of the arcuate brushes facing each other and the brushes extending arcuately around the housing from a position adjacent the reservoir to a position adjacent the point at which seeds are discharged from the cups to the outlet means so each cup is in engagement with the bristles of both brushes for substantially the whole of the arc of rotation after a cup leaves the reservoir to the discharge point.

9. A seed dispensing device as claimed in claim 8, in which two gutters are disposed within the housing one adjacent the end of each arcuate brush next to the point at which seeds leave the cups for discharge into the outlet means, said gutters being disposed to catch seeds within the fed through the bristles by the passage of the cups therethrough, to guide caught seeds back to said reservoir.

10. A seed dispensing device as claimed in claim 9, in which each said gutter is provided with a longitudinally-extending groove along which a caught seed rolls.

11. A seed dispensing device as claimed in claim 1, in which an extra pair of brushes is provided within said housing disposed one to each side respectively of said wheel member with the free ends of the bristles brushing against the wheel member, said extra pair of brushes extending generally radially but being spaced arcuately so that said wheel member on rotation first is brushed by one brush and then is brushed by the other brush, said extra pair of brushes having a radial extent sufficient to brush the region between the major part of said wheel member and each said spoke-like projection thereof.

12. A seed dispensing device as claimed in claim 11, in which said extra pair of brushes is provided part-way between the ends of said arcuate other brushes disposed to sweep against the cups to remove excess seeds therefrom and to assist retention of single seeds therein.

13. A seed dispensing device as claimed in claim 11, in which said extra pair of brushes is positioned within the housing with each brush extending substantially vertically, one said brush forwardly of and the other said brush rearwardly of the axis of rotation of the wheel member when the housing is in the normal operating disposition.

14. A seed dispensing device comprising a housing defining a reservoir for holding a mass of seeds, a wheel member mounted in a substantially vertical plane for rotation in one direction within said housing, a number of spoke-like projections radiating from said wheel member, a cup mounted on the radially outer end of each said projection and so oriented that the cup mouth opens tangentially and forwardly in said direction of rotation of the wheel member for picking up one seed from the reservoir on rotation of said wheel member, opposed arcuate brushes arranged within the housing beyond the reservoir in said direction of rotation which brushes brush against the cups to aid retention of seeds therein as each cup is rotated past the top dead center position, the free ends of the bristles of the arcuate brushes facing each other and the brushes extending arcuately around the housing from a position adjacent the reservoir to a position adjacent the point at which seeds are discharged from the cups to the outlet means so each cup is in engagement with the bristles of both brushes for substantially the whole of the arc of rotation after a cup leaves the reservoir to the discharge point, outlet means from said housing situated outside the periphery of wheel member beyond said brushes in the direction of rotation for receiving seeds discharged from said cups under the combined action of centrifugal and gravitational forces and dispersing the same, two gutters are disposed within the housing one adjacent the end of each arcuate brush next to the point at which seeds leave the cups for discharge into the outlet means, said gutters being disposed to catch seeds within and fed through the bristles by the passage of the cups therethrough, to guide caught seeds back into said reservoir, an extra pair of brushes disposed one to each side respectively of said wheel member with the free ends of the bristles brushing against the wheel member, said extra pair of brushes extending generally radially but being spaced arcuately so that said wheel member on rotation first is brushed by one brush and then is brushed by the other brush, said extra pair of brushes having a radial extent sufficient to brush the region between the major part of said wheel member and each said spoke-like projection thereof, cleaning brush means for cleaning each cup prior to said cup entering the mass of seeds in the reservoir, the cleaning brush means consisting of a generally disc-shaped brush element provided with tangentially-extending bristles, the brush element being rotatably mounted within said housing, the axis of the brush element being to one side of the plane of rotation of the wheel member and said bristles facing the open mouths of the cups as said wheel member rotates, whereby said bristles have a cleaning action by entering the cups as the cups move past cleaning brush means after discharge of a contained seed, and ejecting means to eject foreign matter from the mass of seeds contained in the reservoir, the ejecting means comprising an aperture formed in the lower part of the housing, a plate partially blocking said aperture, and driving means to impart an oscillatory movement to the plate whereby foreign matter is rolled out of the aperture when said plate is oscillated by said driving means, and cleaing brush means for cleaning each cup prior to the cups entering the mass of seeds in said reservoir.

15. A seed dispensing device as claimed in claim 14, in which inlet means is provided for introducing seeds into said reservoir, which inlet means comprises a side wall of the housing shaped to define an inlet port, said side wall extending parallel to the plane of rotation of the wheel member, a hopper for seeds and a duct connecting the hopper to the inlet port to allow seeds in the hopper to fall under gravity down the duct and through the inlet port into the reservoir, at least the greater area of said inlet port lying within a quadrant of the housing defined by two radii from the axis of rotation of said wheel member which radii extend vertically downwardly and horizontally respectively from said axis and considering the normal direction of rotation of said wheel member, there being a gate member for the port which gate member is adjustably mounted on said side wall to allow restriction of the vertical extent of the port.

* * * * *